(12) United States Patent
Rao (10) Patent No.: US 7,554,241 B2
(45) Date of Patent: Jun. 30, 2009

(54) THREE-GAPPED MOTOR WITH OUTER ROTOR AND STATIONARY SHAFT

(76) Inventor: Dantam K. Rao, 2212 Lynnwood Dr., Schenectady, NY (US) 12309

( * ) Notice: Subject to any disclaimer, the term of this patent is extended or adjusted under 35 U.S.C. 154(b) by 299 days.

(21) Appl. No.: 11/278,374

(22) Filed: Mar. 31, 2006

(65) Prior Publication Data

US 2007/0228860 A1  Oct. 4, 2007

(51) Int. Cl.
*H02K 21/12* (2006.01)
*H02K 1/00* (2006.01)

(52) U.S. Cl. .................. 310/266; 310/203; 310/206; 310/216; 310/217; 310/268

(58) Field of Classification Search ............. 310/75 R, 310/75 C, 203, 206, 208, 216–217, 266, 268 310/156.37–156.39
See application file for complete search history.

(56) References Cited

U.S. PATENT DOCUMENTS

| | | | |
|---|---|---|---|
| 3,549,926 A * | 12/1970 | Pentland ................... 310/194 |
| 3,868,766 A * | 3/1975 | Gramlich et al. ............ 29/596 |
| 4,441,043 A * | 4/1984 | DeCesare ................... 310/46 |
| 4,591,751 A * | 5/1986 | Ono .......................... 310/269 |
| 4,625,135 A | 11/1986 | Kasabian |
| 4,996,457 A | 2/1991 | Hawsey et al. |
| 5,117,141 A | 5/1992 | Hawsey et al. |
| 5,245,270 A | 9/1993 | Akiyama |
| 5,280,209 A | 1/1994 | Leupold et al. |
| 5,541,460 A | 7/1996 | Dunfield et al. |
| 5,561,335 A | 10/1996 | Dunfield et al. |
| 5,619,087 A | 4/1997 | Sakai |
| 5,625,241 A | 4/1997 | Ewing et al. |
| 5,838,079 A | 11/1998 | Morohashi et al. |
| 5,864,197 A | 1/1999 | Naito et al. |
| 5,894,902 A * | 4/1999 | Cho ........................ 180/65.5 |
| 5,952,756 A | 9/1999 | Hsu et al. |
| 6,137,394 A * | 10/2000 | Holmes et al. ............ 336/208 |
| 6,232,690 B1 | 5/2001 | Schmider |
| 6,346,759 B1 * | 2/2002 | Suzuki et al. .............. 310/254 |
| 6,426,577 B1 | 7/2002 | Sekiyama et al. |
| 6,462,449 B1 | 10/2002 | Lucidarme et al. |
| 6,555,942 B1 * | 4/2003 | Hsu .......................... 310/208 |
| 6,891,306 B1 * | 5/2005 | Soghomonian et al. ..... 310/218 |

* cited by examiner

*Primary Examiner*—Tran N Nguyen
(74) *Attorney, Agent, or Firm*—Clyde I. Coughenour (57) ABSTRACT

A motor with three gaps produces higher torque than existing one or two gap motors. The motor uses both one radial and two axial gaps to produce torque. A single stator is provided with an essentially "U" shaped rotor shell having permanent magnets with back iron. The stator has loops of coil windings separated by pole pieces. Current flowing in three segments of the coils interacts with the fields from the permanent magnets to produce more torque. The plane of the coils extends through the centerline of the stator. In a given plane through the motor axis, the same polarity of the magnets on the rotor face the stator.

17 Claims, 6 Drawing Sheets

THREE-GAPPED MOTOR WITH OUTER ROTOR AND STATIONARY SHAFT

BACKGROUND OF THE INVENTION

1. Field of the Invention

A three-gap motor has a "U" shaped rotor, with permanent magnets on the radial inner surfaces and axial surfaces, that rotate over coils positioned radially on a stator.

2. Description of Related Art

At present most commercial motors have radial gaps separating the rotor and stator. Those with permanent magnets have cylindrical rotors attached to a rotating shaft covered by stationary lamination stacks, with the rotor and stator separated by a radial gap. Arc shaped permanent magnets are mounted around the outer periphery of the rotor and face radially outward. Several pairs of magnets of alternating polarity are disposed around the rotor producing rotating magnetic fields within the radial air gap. Stator windings are placed in slots within the stationary lamination stack and loop from one slot to another. Conductor segments within the slots link gap fields to produce torque. Coil segments that are outside the field, called end windings produce no torque. Examples are G. Kasabian (U.S. Pat. No. 4,625,135, issued Nov. 25, 1986) and Leupold et al (U.S. Pat. No. 5,280,209, issued Jan. 18, 1994).

Few commercial motors are of the axial gap type, that employ flat disc shaped rotors and toroidal cores separated by an axial gap. Permanent magnets, that face the stator axially, are mounted on the flat surface of the rotor. Several pairs of flat magnets of alternating polarity generate a rotating magnetic field within the axial air gap. The stator windings are placed within the slots of the toroidal core, and loop from one slot to another. Conductor segments within the slots link the gap field to produce torque. Conductors outside the segments, called end windings, do not produce torque, but do contribute to loss. Examples of such patents are K. Sakai (U.S. Pat. No. 5,619,087, issued Apr. 8, 1997) and Hawsey et al (U.S. Pat. No. 4,996,457, issued Feb. 26, 1991).

Recently, a few patents have combined both approaches and employed both axial gaps and radial gaps to produce torque. Examples are N. Akiyama (U.S. Pat. No. 5,245,270, issued Sep. 14, 1993), Ewing et al (U.S. Pat. No. 5,625,241, issued Apr. 29, 1997), Morohashi et al (U.S. Pat. No. 5,838,079, issued Nov. 17, 1998), Naito et al (U.S. Pat. No. 5,864,197, issued Jan. 26, 1999), Hsu et al (U.S. Pat. No. 5,952,756, issued Sep. 14, 1999) F. Schmider (U.S. Pat. No. 6,232,690, issued May 15, 2001) and Lucidarme et al (U.S. Pat. No. 6,462,449 issued Oct. 8, 2002).

Hsu et al (U.S. Pat. No. 5,952,756, issued Sep. 14, 1999) describe an outer stator type motor. Three sets of permanent magnets are attached at the center of a shaft and three sets of corresponding stators are fastened to a surrounding frame. Two sets of flat permanent magnets create fields in the two axial gaps and one set of permanent magnets around the periphery create fields in one radial gap. The coil windings loop around the slots. Such 3-gap motors however suffer from several disadvantages. These 3-gapped motors in the prior art do not offer high torque density, are very expensive and have poor efficiency and can run hot.

Soghomoniam et al (U.S. Pat. No. 6,891,306, issued May 10, 2005) show another invention that uses 3 gaps, but with an outer rotor. The rotor uses two sets of flat magnets to energize two axial gaps and two sets of peripheral magnets of relatively smaller size to energize the radial gaps. The flat magnet facing one axial gap is polarized North, while that facing another axial gap is polarized South. A set of solenoidal electromagnets with annular windings generate alternating fields that interact with rotating fields to produce the motor torque.

SUMMARY OF THE INVENTION

The invention discloses a novel stator winding and core configuration with no slots. The invention relates to permanent magnet motors. Of special interest are those with rotors enclosing an internal stator. Such motors are used in wide ranging applications such as bike motors, hub motors, reaction wheels, momentum wheels, gyroscopes etc. The invention centers around motors that use multiple air gaps between the rotor and stator and multiple coil segments to produce higher torque per unit volume.

A "U" shaped rotor has axial magnets facing two axial sides of a stator and radial magnets facing the radial side of the stator. The permanent magnets are arranged with alternating polarities. The axial and radial permanent magnets on the rotor are arranged so that any plane through the axis of rotation intersects magnets of like polarity. The coils are arranged on a toroid between alternate pole pieces and coils.

DESCRIPTION OF THE PREFERRED EMBODIMENTS

Figure 1:
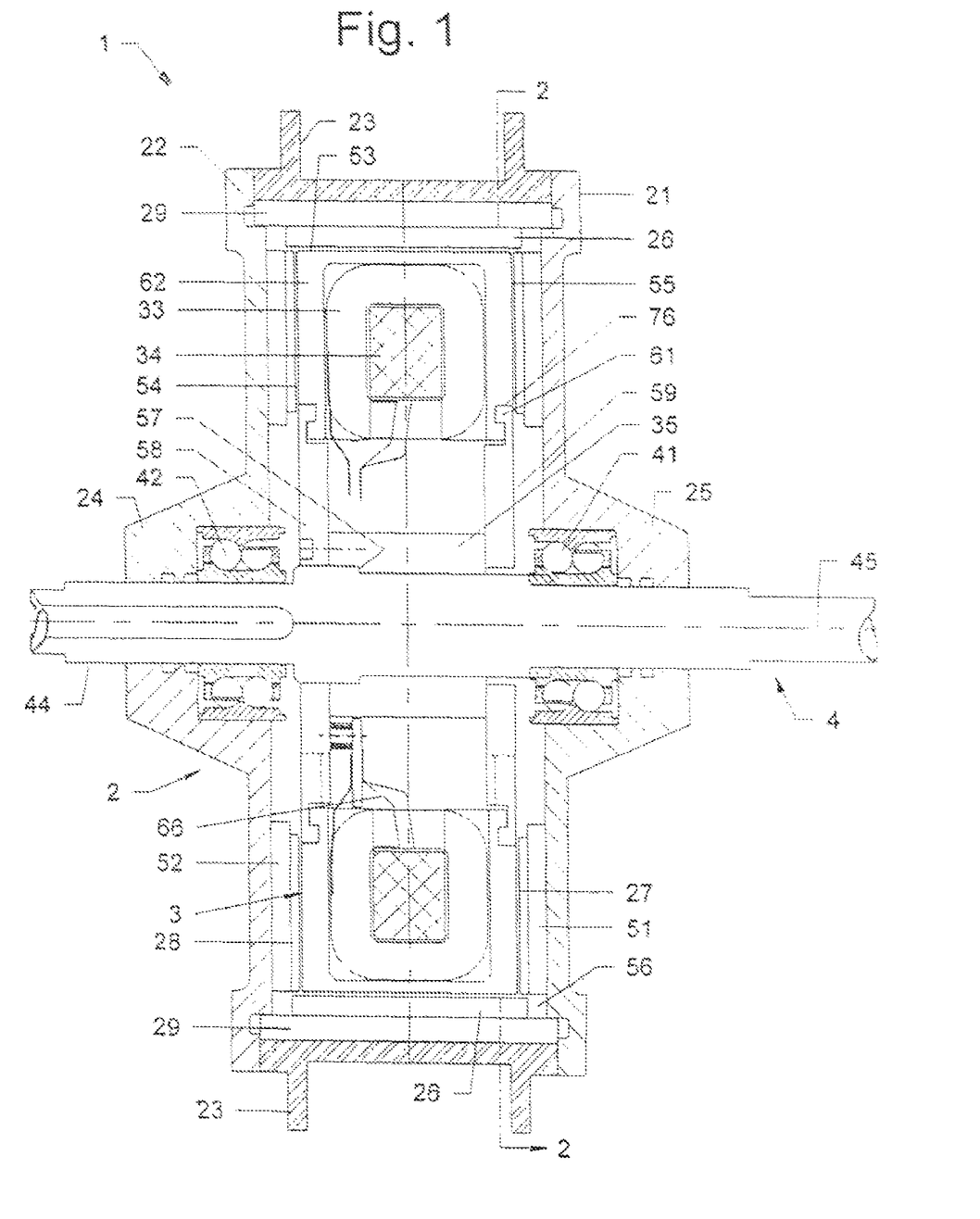
FIG. 1 is a cross-sectional front view of the motor showing the basic components in the preferred embodiment of the three-gap motor.

FIG. 1 shows a front cross-sectional view of the three-gapped motor. The motor 1 consists of a rotor subassembly 2, a stator subassembly 3 and a shaft subassembly 4. The rotor support structure consists of two disc-shaped rotor brackets 21, 22 sandwiching a rotor shell 23. The rotor brackets 21, 22 have hub portions 24, 25 at their center or inner ends; a non-rotating shaft 44 extends through the openings of the hubs 24, 25 and are connected to the rotor subassembly 2 by two ball bearings 41, 42 as shown. The bearings may be of angular contact or roller bearings type depending on the size and application requirements. The rotor subassembly 2 rotates over the stationary shaft 44 on the bearings 41, 42.

Figure 2:
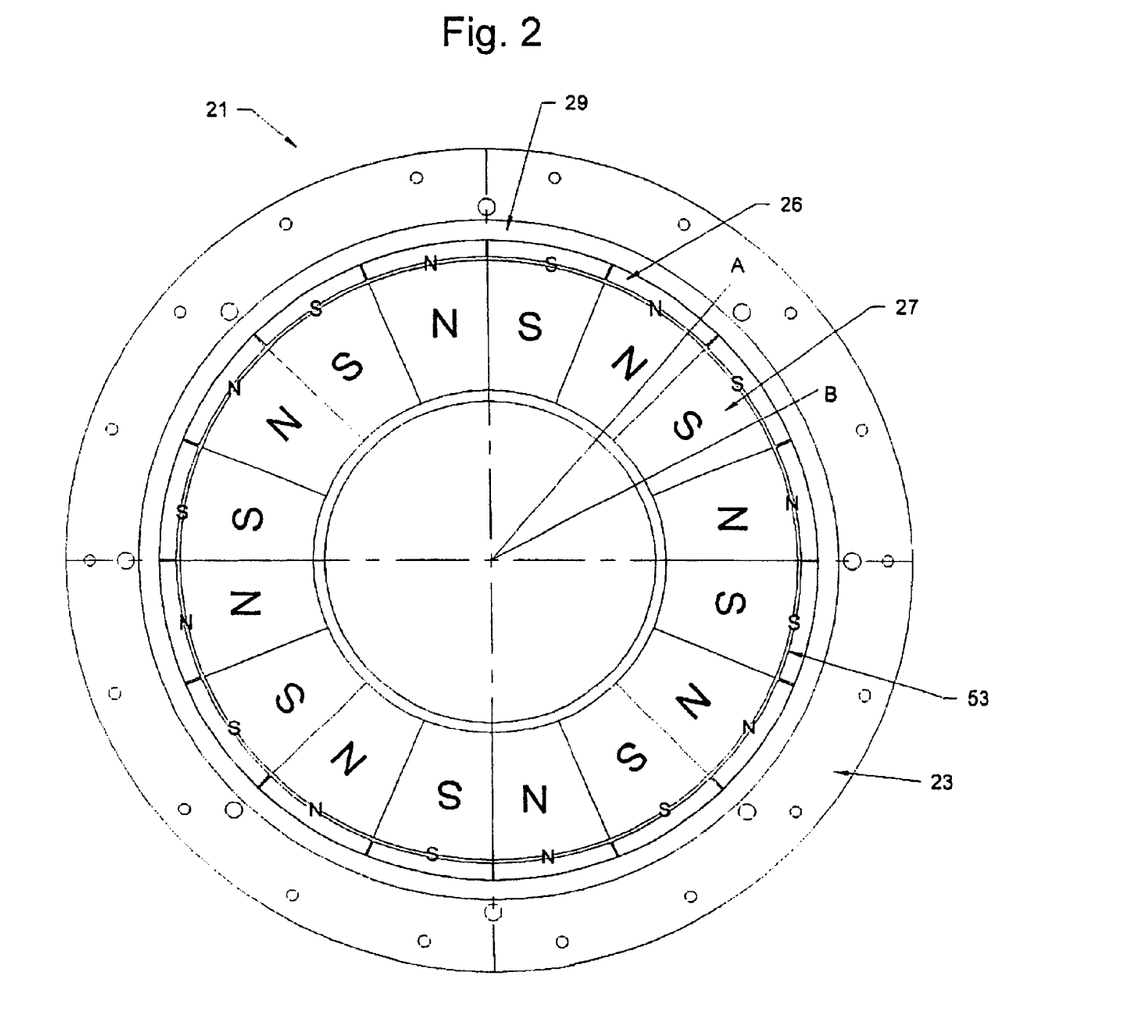
FIG. 2 is a side sectional view generally along the section lines 2-2 of FIG. 1 and FIG. 7 indicating the magnet polarity of the rotor.

With reference to FIGS. 1 and 2, FIG. 2 is an end or side view along the section lines 2-2 in FIG. 1 (and FIG. 7) showing the magnet arrangement and support of the rotor 2. Three sets of permanent magnets are fastened to the rotor support structure, one radial 26 and two axial 27, 28.

The radial magnets 26 extend over essentially the full axial length of the rotor inner shell 23 surface and are spaced equidistantly around essentially the circumference of the shell. The magnets are arranged with alternating polarity. The magnets are attached to a circular ring of back iron 29 using epoxy. The number, size and shape of the magnets depend on the application and torque requirements. The radial magnets 26 are polarized in the radial direction. All magnets on any radial line have the same polarity. For example, FIG. 2 shows that along one radial line both radial and axial magnets facing the air gap have North polarity and along the neighboring radial line both radial and axial magnets facing the air gap have South polarity.

Two sets of flat magnets 27, 28 are attached to the inner flat surface of each rotor bracket 21, 22 respectively via back iron discs 51, 52. These magnets are arranged in a circular ring fashion. The number of flat magnets is identical to that of the radial magnets 26. The flat axial magnets 27, 28 on the rotor brackets 21, 22 are alined so that the polarity of the magnets is the same across the air gaps. The axial magnets 27, 28 can be sector shaped as shown in FIG. 2. These magnets are polarized in the axial direction and arranged to have alternating polarity. All these magnets may be made of any permanent magnet material, such as Neodmium Boron Iron, Ferrite or other magnetic material depending on the particular application.

Both the radial magnets 26 and axial magnets 27, 28 generate magnetic fields that energize respectively the radial 53 and the axial gaps 54, 55. As shown in FIG. 2, both radial and axial magnets subtend the same angle to the center of rotation of the motor, i.e. the axis or centerline 45 of the shaft 44. All magnets are polarized such that a radial magnet that has a north pole facing the radial air gap 53 will be in close proximity of an axial magnet 27 that has a north pole facing the axial air gap 55. The same applies to the south pole magnets.

FIG. 1 (as well as FIG. 7) shows sectional views of the stator 3 within or under the rotor 2. The stator is located within the inner hollow space 56 formed by the permanent magnet shell 23, and is separated from the magnets by one radial gap 53 and two axial gaps 54, 55. The stator 3 can be attached to the stationary shaft 44 by two ring shaped stator hubs 58, 59 with a sleeve 35 in between as shown in FIG. 1. The two hubs are clamped on their two inner faces to the sleeve 35 by screws. The sleeve 35 and shaft 44 have a step 57 that positions the sleeve on the shaft. The hubs have a projecting tongue 61 that locks into blind grooves 76 within the stator pole pieces 62 inner ends. The stator, hubs, sleeve, and shaft form a rigid stationary assembly.

How the hubs 58, 59 connect the stator 3 to the shaft 4 can be seen in FIG. 1. The pole piece 62 will have a groove 76 and the flat hubs 68, 69 will have a mating ring-shaped tongue 61. The circular ring shaped tongue 61 on the flat disc shaped hubs mate into all the grooves 76 of the pole pieces. A sleeve 35 at the center separates the hubs and attaches to the shaft.

Figure 3:
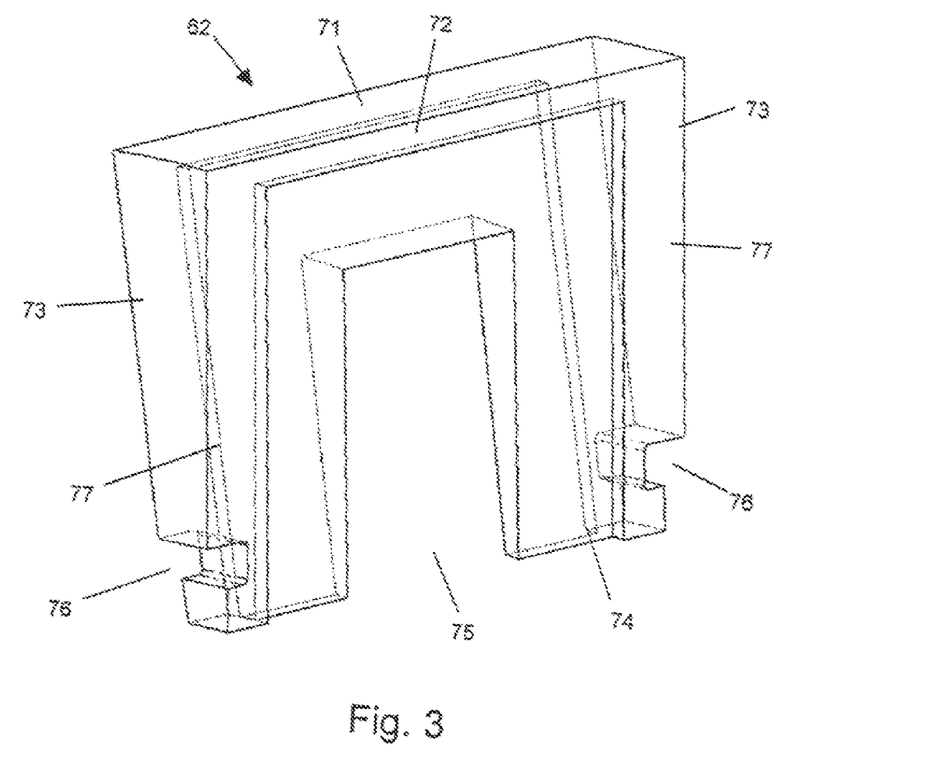
FIG. 3 is a three-dimensional perspective view of a pole piece showing its salient features.

The pole piece 62 is shown in FIG. 3, it is made of a soft steel or powdered iron core. It has two legs 77 extending from a shoe 72. The air gap between the magnets and these pole shoe faces define the area where interaction between magnetic energy and mechanical energy takes place.

The pole piece is a "U" shaped iron part. It has radial legs 77 with pole faces 73 and one axial shoe 72 with pole face 71. The outwardly facing pole faces present a relatively large iron area to the magnets. The axial pole shoe 72 is aligned with the radial magnets 26, while the radial legs 77 are aligned with the axial magnets 27, 28. The leg faces 73 face toward and adjacent the axial magnets 27, 28 and the shoe 72 pole face 71 faces toward and adjacent the radial magnets 26. The pole pieces 62 taper radially inwards. The pole piece legs 77 also have two blind grooves 76 at the bottom to catch or engage tongues 61 on the hubs. It has an opening or slot 75 at the center to slide over the toroid, shown in FIG. 4. The width of this opening 75 is slightly larger than the axial thickness of the toroid, and its height is slightly larger than the height of the toroid, so that the pole piece can slide radially over the toroid. The pole piece has an enlarged axial pole shoe face 71 and leg faces 73 at the outer periphery to catch the flux from the magnets. The shoes are shaped to yield a recess or blind cutout 74 on both lower flat faces 77. These cutouts provide space into which a portion of the coils fit. This pole piece can be made by precision casting or powder metallurgy.

Figure 4:
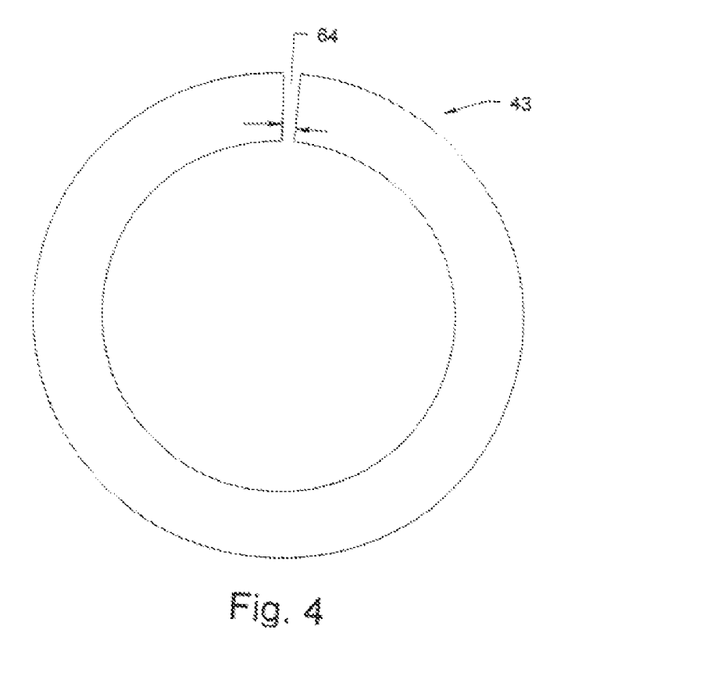
FIG. 4 is a side view of a toroid with a wide slot.

FIG. 4 shows a toroid 43. The toroid's primary purpose is to provide an easy return path for the flux generated by permanent magnets and coil currents. The construction shown is provided with a trapezoidal slot 64. The toroid may be made of a stack of laminations or of a tape wound strip. It has an opening that can be a narrow, rectangular slit shape 78 shown in FIG. 6, or it can be a large trapezoidal slot opening 64 shown in FIG. 4.

Figure 6:
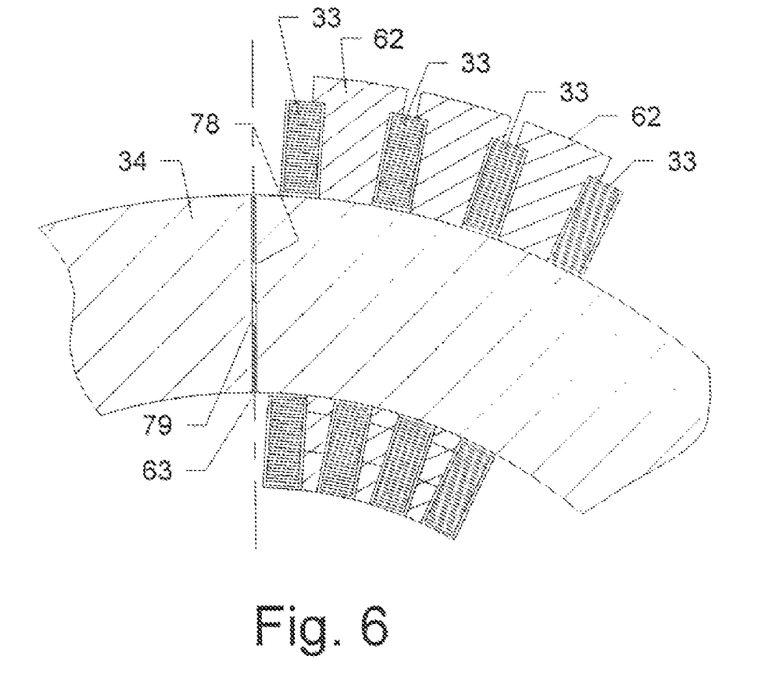
FIG. 6 is a side view showing a series of pole pieces and coils alternately placed over a toroid.

The construction in FIG. 6 shows how a garland of pole pieces and coils can be made over a toroid 34. The toroid is made of a loose stack of laminations. Because of their flexibility, the loose laminations allow the one edge 78 of the slit 64 to be fixed while the other edge 79 is bent axially out, as in a key-chain ring, and coils and slots are inserted alternately over the flexible toroid.

If this toroid design of FIG. 4 is used, there is no need to pull the edges axially apart. This specific toroid can be made of a lamination stack or tape wound strip. The stack or strip can then be resin molded and a trapezoidal slit made in it. The coil windings and pole pieces are then inserted over the rigid toroid through this trapezoidal slot. When the entire assembly is finished, the last wedge shaped pole piece is inserted into the slot to make a rigid assembly of toroid, pole pieces and coils. The entire stator assembly is potted to further ensure that no part will move relative to each other.

Figure 5:
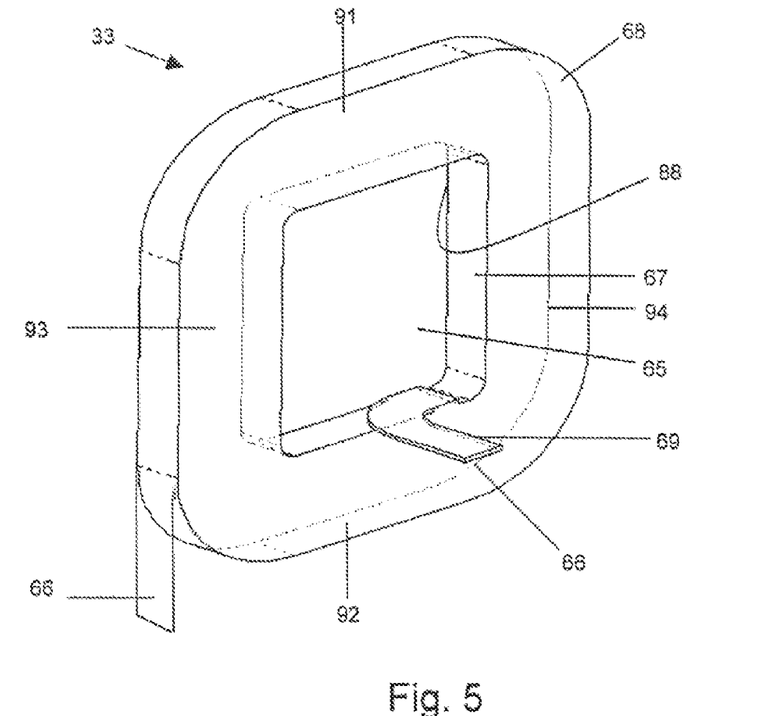
FIG. 5 is a three-dimensional perspective view of a coil winding.

FIG. 5 shows a typical coil winding 33. The coil is made of insulated magnet wire, bondable magnet wire or flat wire or any other form of insulated copper wire. It is wound around a rectangular preform that corresponds to the cross-section of the coil window 65. The coil window section itself is slightly bigger than the cross-section of the toroid 34, 43 so that the coil can be garlanded over the toroid. The wound coil is insulated 32 to protect it from metal contact. When inserted into the stator, its flat outer faces 68, 88 graze the inside of the iron pole, cutouts 74 while the inner window faces 67 graze the toroid 34, 43. These faces must be insulated to prevent arcing. The toroid has sharp edges which can damage the insulation, so an insulation coating must be applied either to the toroid and iron pole pieces, or to the coil or to a combination of them. Commercial means of insulation, such as powder coating, epoxy coat, varnish, film wrap, cloth wrap, etc., can be used to insulate the coil winding from the pole piece and the toroid.

The coil flat front face 68 and flat rear face 88 extend in planes that essentially extend through the shift centerline with the coil outer axial extent and inner axial extent essentially parallel to the shaft centerline 45. The coil first radial extent 93 and second radial extent 94 are essentially perpendicular to the shaft centerline 45.

As shown in FIG. 6, the stator includes pole pieces 62 and coils 33 that alternate and are mounted over a toroid 34. Each of the two coil leads 66 of each coil are interconnected in a standard well known manner to form three phase windings. A coil 33 is inserted peripherally through the toroid 34 slot 63 or slit 64. A pole piece 62 is next inserted radially, and this coil/pole set is slid clockwise away from the slit to make room for the next coil and pole set. The pole pieces and coils are inserted alternatively over the toroid until the entire toroid is filled with pole pieces and coils.

Figure 7:
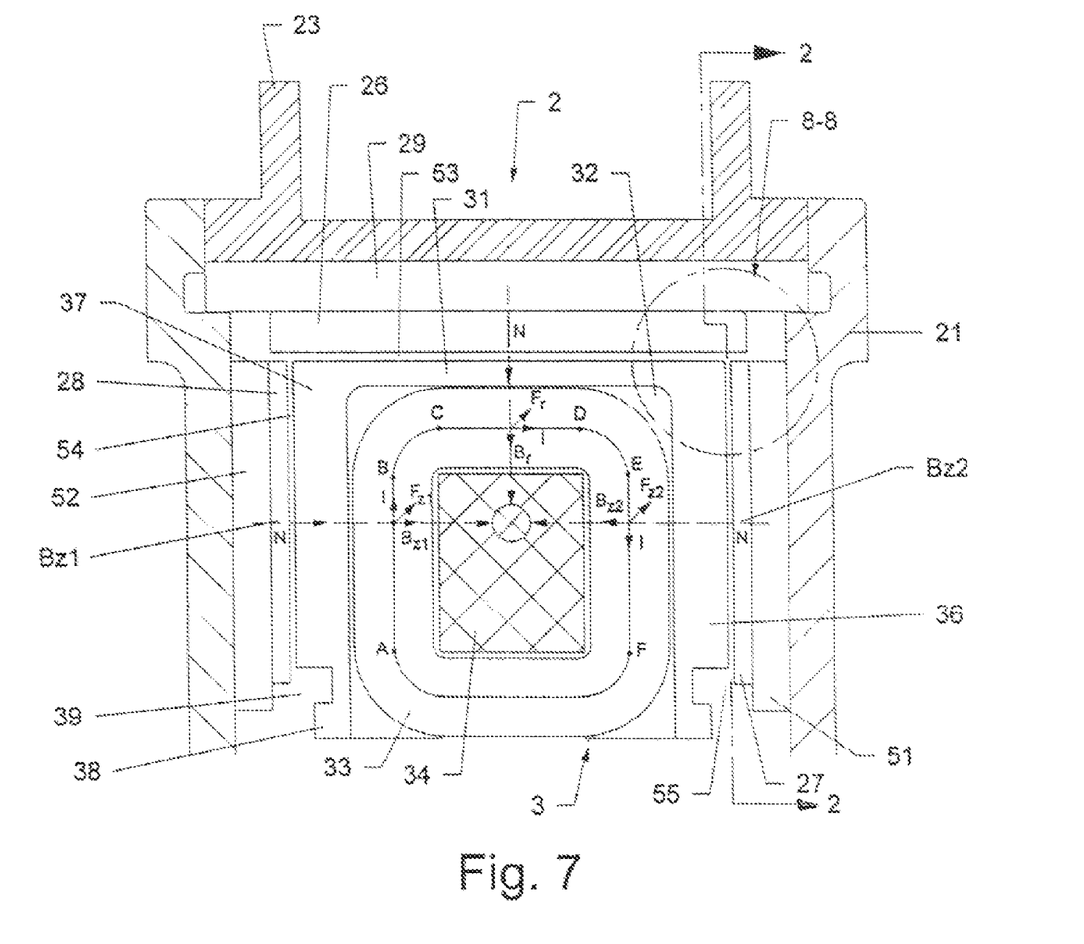
FIG. 7 is a partial front view indicating how fields in the 3 gaps interact with currents in the 3 segments of coils.
Figure 8:
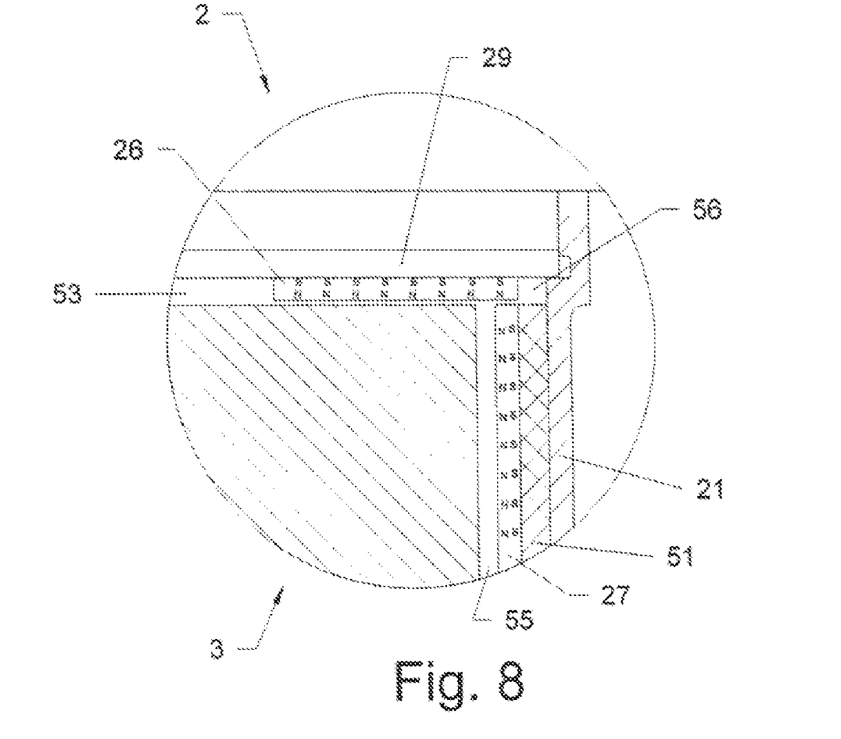
FIG. 8 is an enlarged sectional front view of the upper right corner at 8-8 of the rotor-stator of FIG. 7

FIG. 7 shows the relationship between the stator and rotor and how the motor develops torque using fields in 3 gaps. The primary rotary components are: the rotor 2, the bracket 21 22, 23, iron backings 29, 51, 52 and permanent magnets 26, 27, 28. The primary stationary components are: stator 3, pole pieces 62, coils 33 and toroid 34. They are separated by gaps 53, 54, 55 between them. The details of one corner of the stator 3 and stator 4 are broken out as FIG. 8 shown as 8-8 on FIG. 7.

The coil has three active segments, radial segment AB, axial segment CD and radial segment EF. As shown the radial segment AB carries current that travels radially outward. The axial magnet 28 has its north pole facing the axial pole face 73; it emanates field Bz1 that travels from left to right into the gap. Per Lenz law, the radially outward current links with this axially inward field. Since both the field and current are perpendicular to each other, their interaction produces a force that is perpendicular to both, in the tangential direction. This force is tangential to the stator and is into the plane of the paper as shown. This force produces torque.

In a similar manner, radial segment of coil EF carries a radially inward current I. The axial magnet 27 also has a north pole facing the iron of the stator pole shoe 73. It generates a field that is axial and travels from right to left. Again this field and current link to produce a magnetic force which results in torque. This torque adds to that produced by the conductor AB.

The coil also has an axial segment CD. Current is traveling from left to right in this segment of the coil. The radial magnets generated magnetic field, travels downwards. The current traveling from left to right link with the field Br traveling downward produce an additional magnetic force that is tangential to the stator ring. This force also contributes torque. This torque adds to the torque produced by AB and EF. The net result is that all three segments, AB, CD and EF of the coil participate in the production of torque, thereby increasing the torque significantly.

In FIG. 8, the radial magnet 26 and axial magnet 27 are respectively supported by back iron ring 29 and back iron disk 51 supported by rotor bracket 21 with pole piece 62 in the hollow space 56 between the rotor 2 and stator 3 spaced by axial gap 55 and radial gap 53. The radial polarization of the radial magnets 26 and axial polarization of the axial magnet 27 are illustrated.

Figure 9:
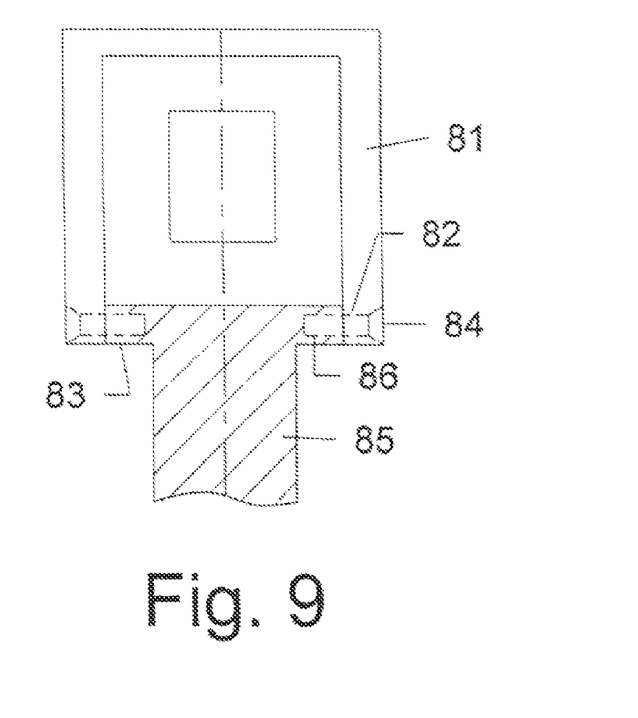
FIG. 9 is a front view of an alternative hub design for attaching the stator to the motor shaft.

FIG. 9 is an alternative arrangement for connecting a hub 85 to the shaft 4. This arrangement uses only one part to attach the stator to the shaft. In this arrangement, the pole piece 81 will have a through hole 82 at the inner radius as shown. A ring-shaped hub 85 has protruding rim 83 that has multiple holes 86. Machine screws 84 are inserted through the holes on the pole pieces into the holes to attach the pole pieces to the hub. The hub itself is attached to the shaft through a standard method of shrink fit or a key bounced against a shaft shoulder.

It is believed that the construction, operation and advantages of this invention will be apparent to those skilled in the art. It is to be understood that the present disclosure is illustrative only and that changes, variations, substitutions, modifications and equivalents will be readily apparent to one skilled in the art and that such may be made without departing from the spirit of the invention as defined by the following claims.

The invention claimed is:

1. A three-gap electrical device comprising:
an elongated shaft;
a stator and a rotor supported by said elongated shaft;
said stator supports a plurality of coils, each coil having an essentially flat front face and an essentially flat rear face and a first radial extent and a second radial extent, an outer axial extent and an inner axial extent between said first and said second radial extent with said first radial extent and said second radial extent axially separated;
said rotor supports a plurality of permanent magnet sets;
a first set of permanent magnets extend axially on said rotor radially outward from said coils outer axial extent on said stator;
a second set of permanent magnets on said rotor extends radially adjacent said first radial extent of said coils on a first axial side of said coils on said stator;
said stator on a first axial side of said first set of permanent magnets;
a third set of permanent magnets on said rotor extends radially adjacent said second radial extent of said coils on a second axial side of said coils on said stator;
a first gap formed between said first set of permanent magnets and said coils outer extent;
a second gap formed between said second set of permanent magnets and said coils first radial extent;
a third gap formed between said third set of permanent magnets and said coils second radial extent;
tapered pole pieces extend between said plurality of flat faced coils and said plurality of permanent magnets;
said first set of permanent magnets facing said stator has the same polarity facing said stator that said second set of permanent magnets and said third set of permanent magnets facing said stator have at the same radial positions such that a plane extending through the centerline of the elongated shaft extending radially outward encounters the magnets of the first set and second set and third set of the same polarity.

2. A three-gap electrical device as in claim 1 wherein:
said elongated shaft is a non-rotating shaft.

3. A three-gap electrical device as in claim 2 wherein:
said rotor includes a first and a second rotor bracket with a shell joining the outer ends of said first and said second rotor brackets;
a hub on the inner ends of both said first and said second rotor brackets supporting said rotor on said elongated shaft;
a first bearing between said first rotor bracket hub and said elongated shaft and a second bearing between said second rotor bracket hub and said elongated shaft for providing relative movement between said rotor and elongated shaft.

4. A three-gap electrical device comprising:
an elongated shaft;
a stator and a rotor supported by said elongated shaft;
said stator supports a plurality of coils, each coil having an essentially flat front face and an essentially flat rear face and a first radial extent and a second radial extent, an outer axial extent and an inner axial extent between said first and said second radial extent with said first radial extent and said second radial extent axially separated;
said rotor supports a plurality of permanent magnet sets;
a first set of permanent magnets extend axially on said rotor radially outward from said coils outer axial extent on said stator;
a second set of permanent magnets on said rotor extends radially adjacent said first radial extent of said coils on a first axial side of said coils on said stator;
said stator on a first axial side of said first set of permanent magnets;

a third set of permanent magnets on said rotor extends radially adjacent said second radial extent of said coils on a second axial side of said coils on said stator;
a first gap formed between said first set of permanent magnets and said coils outer extent;
a second gap formed between said second set of permanent magnets and said coils first radial extent;
a third gap formed between said third set of permanent magnets and said coils second radial extent;
tapered pole pieces extend between said plurality of flat faced coils and said plurality of permanent magnets;
said elongated shaft is a non-rotating shaft;
said stator includes a stator sleeve secured to said elongated shaft with the lower extent of a first and a second stator hub secured to said stator sleeve;
said first and said second stator hubs have tongues formed on their upper ends.

5. A three-gap electrical device as in claim 4 including:
said tapered pole pieces for spacing and holding said coils in place;
said tapered pole pieces being generally "U" shaped with a radial pole shoe having radial legs extending inwardly from said radial pole shoe;
said radial legs lower ends are formed with grooves;
said tapered pole pieces are secured to said elongated shaft by engaging said stator hub tongue with said tapered pole pieces radial legs lower end grooves.

6. A three-gap electrical device as in claim 5 wherein:
said coils each have a central coil window;
said generally "U" shaped tapered pole pieces each have a slot extending between radial legs;
a toroid extends alternately through said coils and said pole pieces around the circumference of said stator.

7. A three-gap electrical device comprising:
an elongated shaft;
a stator and a rotor supported by said elongated shaft;
said stator supports a plurality of coils, each coil having an essentially flat front face and an essentially flat rear face and a first radial extent and a second radial extent, an outer axial extent and an inner axial extent between said first and said second radial extent with said first radial extent and said second radial extent axially separated;
said rotor supports a plurality of permanent magnet sets;
a first set of permanent magnets extend axially on said rotor radially outward from said coils outer axial extent on said stator;
a second set of permanent magnets on said rotor extends radially adjacent said first radial extent of said coils on a first axial side of said coils on said stator;
said stator on a first axial side of said first set of permanent magnets;
a third set of permanent magnets on said rotor extends radially adjacent said second radial extent of said coils on a second axial side of said coils on said stator;
a first gap formed between said first set of permanent magnets and said coils outer extent;
a second gap formed between said second set of permanent magnets and said coils first radial extent;
a third gap formed between said third set of permanent magnets and said coils second radial extent;
tapered pole pieces extend between said plurality of flat faced coils and said plurality of permanent magnets;
said stator has a generally "U" shaped tapered pole piece having an axial pole shoe with inwardly extending radial legs on either end of said axially extending pole shoe;
said pole shoe has a front surface and a rear surface;
said pole shoe tapers such that a plane extending along said front surface and a plane extending along said rear surface will meet at the elongated shaft centerline.

8. A three-gap electrical device as in claim 7 wherein:
said tapered pole piece tapered pole shoe front surface and said tapered pole tapered rear surface have recesses for receiving and holding said coil faces.

9. A three-gap electrical device as in claim 6 wherein:
the spacing between said coils and said tapered pole pieces is filled with an insulation material that secures said coils, said pole pieces and said toroid together.

10. A three-gap electrical device as in claim 1 wherein:
a back iron ring extends around the circumference of said rotor under said first set of permanent magnets;
a first back iron disc extends radially under said second set of permanent magnets;
a second back iron disc extends radially under said third set of permanent magnets.

11. A three-gap electrical device as in claim 7 wherein:
said coils first radial extent and said coils second radial extent are essentially perpendicular to the centerline of said elongated shaft and said coil outer axial extent and said coil inner axial extent are essentially parallel to said elongated shaft centerline.

12. A three-gap electrical device as in claim 7 wherein:
said coils flat front faces and said coils rear faces are essentially in planes that pass through said elongated shaft centerline.

13. A three-gap electrical device comprising:
an elongated shaft;
a stator having an outer extent and a first side and a second side supported by said elongated shaft;
a rotor having an outer extent and a first radial extent and a second radial extent supported by said elongated shaft;
a plurality of coils supported on said stator, each coil having a flat front face and a flat rear face, and a first radial extent and a second radial extent, an outer axial extent and an inner axial extent between said first and said second radial extents;
a plurality of permanent magnet sets support by said rotor;
a first set of permanent magnets on said rotor outer extent extending radially over said stator outer extent;
a second set of permanent magnets on said rotor first radial extent extending axially adjacent said stator first side;
a third set of permanent magnets on said rotor second radial extent extending axially adjacent said stator second side;
a first gap formed between said first set of permanent magnets and said coils outer extent;
a second gap formed between said second set of permanent magnets and said coils first radial extent;
a third gap formed between said third set of permanent magnets and said coils second radial extent;
said second set of permanent magnets and said third set of permanent magnets each have alternate magnetic polarity facing said stator;
said second set of permanent magnets and said third set of permanent magnets facing said stator have like polarities facing each other axially and radially across said stator.

14. A three-gap electrical device as in claim 13 wherein:
said first set of permanent magnets on said rotor radially outward from said stator coils outer axial extent have magnets of alternate polarity facing said stator;
said first set of permanent magnets have magnets of polarities that are the same polarities as said second set and said third set of magnets facing said stator.

15. A three-gap electrical device as in claim 14 wherein:
said permanent magnets on said rotor have their polarities extending perpendicular to said stator.

16. A three-gap electrical device as in claim 13 wherein:
said first set of permanent magnets are spaced outward from said coils outer extent and have their polarities all extending radially;
said second set of permanent magnets and said third set of permanent magnets spaced axially from said coils first radial extent and second radial extent have their polarities all extending axially.

17. A three-gap electrical device as in claim 13 including:
a pole piece between each of said coils on said stator;
each pole piece being in the general shape of a "U" with radial legs extending from an axial shoe;
said axial shoe and radial legs having outwardly facing pole faces;
said first and second and third permanent magnets sets on said rotor are arranged so that the field created by each magnet of one polarity enters said pole faces on said stator at an essentially perpendicular angle toward an adjacent permanent magnet of the opposite polarity in the same first or second or third set of permanent magnets that it entered from.

* * * * *